US009485789B2

(12) United States Patent
Bergstrom et al.

(10) Patent No.: US 9,485,789 B2
(45) Date of Patent: Nov. 1, 2016

(54) CONNECTION SETUP WITH AN ACCESS SELECTION OF A TERMINAL

(75) Inventors: Andreas Bergstrom, Vikingstad (SE); Hakan Andersson, Solna (SE); Erik Eriksson, Linkoping (SE); Martin Hessler, Linkoping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 275 days.

(21) Appl. No.: 14/375,637

(22) PCT Filed: Jan. 31, 2012

(86) PCT No.: PCT/EP2012/000409
§ 371 (c)(1),
(2), (4) Date: Jul. 30, 2014

(87) PCT Pub. No.: WO2013/113321
PCT Pub. Date: Aug. 8, 2013

(65) Prior Publication Data
US 2014/0376480 A1  Dec. 25, 2014

(51) Int. Cl.
*H04W 4/00* (2009.01)
*H04L 12/56* (2006.01)
(Continued)

(52) U.S. Cl.
CPC ............ *H04W 76/02* (2013.01); *H04W 48/20* (2013.01); *H04W 74/0833* (2013.01); *H04W 72/00* (2013.01)

(58) Field of Classification Search
CPC .................................................. H04W 76/02
See application file for complete search history.

(56) References Cited

U.S. PATENT DOCUMENTS

2005/0147040 A1* 7/2005 Vayanos ........... H03M 13/2707
370/235
2007/0249352 A1* 10/2007 Song ..................... H04L 63/08
455/436

(Continued)

FOREIGN PATENT DOCUMENTS

| EP | 2375848 A1 | 10/2011 |
| WO | 2010104977 A1 | 9/2010 |
| WO | 2010148132 A2 | 12/2010 |

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 10)", 3GPP TS 36.321 V10.0.0 (Dec. 2010), pp. 1-53.

(Continued)

*Primary Examiner* — Gerald Smarth
(74) *Attorney, Agent, or Firm* — Rothwell, Figg, Ernst & Manbeck, P.C.

(57) ABSTRACT

A method for requesting a connection setup of a connection between a terminal (302) and a node (304) of a radio access network (300) is described. The radio access network (300) supports a first access and a second access of the terminal (302) to the radio access network (300) for the connection. The method is executed by the terminal (302). The method comprises determining (314) whether to at least partially accept a network defined condition of the radio access network (300) associated with the first access, selecting (316), from the first access and the second access, the first access based on a result of the step (314) of determining, and requesting (320a, b), from the node (304), the selected first access for the connection. The method may enable an improved management of a quality of service by the radio access network in association with a connection between a terminal and the radio access network.

23 Claims, 5 Drawing Sheets

(51) Int. Cl.
 *H04W 76/02* (2009.01)
 *H04W 48/20* (2009.01)
 *H04W 74/08* (2009.01)
 *H04W 72/00* (2009.01)

(56) References Cited

U.S. PATENT DOCUMENTS

2011/0249641 A1 10/2011 Kwon et al.
2011/0299492 A1 12/2011 Lee et al.
2012/0106370 A1* 5/2012 Radulescu ........ H04W 36/0083
 370/252
2012/0295623 A1* 11/2012 Siomina ................ H04W 64/00
 455/436

OTHER PUBLICATIONS

Dahlman, E., et al., "4G—LTE/LTE-Advanced for Mobile Broadband", Academic Press, 2011, ISBN: 978-0-12-385489-6, pp. 310-319.

* cited by examiner

CONNECTION SETUP WITH AN ACCESS SELECTION OF A TERMINAL

CROSS-REFERENCE TO RELATED APPLICATION

This application is a 35 U.S.C. §371 National Phase Entry Application from PCT/EP2012/000409, filed Jan. 31, 2012, and designating the United States.

TECHNICAL FIELD

The invention relates to methods and nodes for requesting a connection setup of a connection between a terminal and a node of a radio access network.

BACKGROUND

A terminal requests an access to a radio access network, in order to set up a connection between the terminal and the radio access network. Conditions for the granted access are defined by the radio access network, and are equal for all terminals. For example, in an Evolved Universal Mobile Telecommunications System Terrestrial Radio Access Network (E-UTRAN), a terminal requests a random access procedure from a node of the E-UTRAN radio access network, an eNodeB, which procedure is defined by an exchange of random access preambles and of RRC connection establishment procedure related signaling.

However, individual terminals or different types or classes of terminals can be differentiated between one another by requirements posed by the terminals on the radio access network. Those requirements relate, amongst others, to network resources required during the connection and/or to a duration of the established connection. In general, these terminal requirements can be caused by software or hardware constraints of the terminal.

In one example of a terminal comprising a software constraint, the terminal may run a particular application or service, and may thus send signaling information rarely and during a short time duration via the control plane. Such an application could be a social media update associated with periodic status update transmissions and instant messaging, for example Facebook. Accordingly, the terminal may require a short connection duration and thus a short time when being in its connected state. Further, a terminal may run a different application such as Voice over Internet Protocol (VoIP), and may thus request a setup of a connection for a data transmission comprising a limited radio bandwidth. A hardware constraint of the terminal can, for example, be limited energy resources of the terminal, thereby requiring the terminal to preferably switch into its idle state for energy saving purposes.

In all cases, the network may not be aware of the specific requirement of the terminal posed on the connection to be established until the network may have granted the terminal access to the radio access network. Therefore only a limited number of terminals may be simultaneously served by the radio access network and/or a management of a quality of service by the radio access network associated with a connection between a terminal and the radio access network may be poor.

SUMMARY

It is an object of the present invention to provide methods and nodes for an improved management of a quality of service by the radio access network in association with a connection between a terminal and the radio access network.

The object defined above is solved by methods and a terminal for requesting a connection setup of a connection between a terminal and a node of a radio access network, a node of a radio access network for being requested for a connection setup of a connection between a terminal and the node of the radio access network, and a computer program according to the independent claims.

According to an exemplary aspect of the invention, a method for requesting a connection setup of a connection between a terminal and a node of a radio access network is provided. The radio access network supports a first access and a second access of the terminal to the radio access network for the connection. The method is executed by the terminal. The method comprises determining whether to at least partially accept a network defined condition of the radio access network associated with the first access, selecting, from the first access and the second access, the first access based on a result of the step of determining, and requesting, from the node, the selected first access for the connection.

According to another exemplary aspect of the invention, a method for requesting a connection setup of a connection between a terminal and a node of a radio access network is provided. The radio access network supports a first access and a second access of the terminal to the radio access network for the connection. The method is executed by the node. The method comprises receiving a request for the selected first access for the connection, wherein the first access is associated with a network defined condition of the radio access network for the connection, from the terminal having determined whether to at least partially accept the network defined condition for selecting the first access.

According to another exemplary aspect of the invention, a terminal for requesting a connection setup of a connection between the terminal and a node of a radio access network is provided. The radio access network supports a first access and a second access of the terminal to the radio access network for the connection. The terminal comprises a determination unit configured to determine whether to at least partially accept a network defined condition of the radio access network associated with the first access, a selection unit configured to select from the first access and the second access, the first access based on a result of the determination unit, and a requesting unit configured to request, from the node, the selected first access for the connection.

According to another exemplary aspect of the invention, a node of a radio access network for being requested for a connection setup of a connection between a terminal and the node of the radio access network is provided. The radio access network supports a first access and a second access of the terminal to the radio access network for the connection. The node comprises a reception unit configured to receive a request for the selected first access for the connection, wherein the first access is associated with a network defined condition of the radio access network for the connection, from the terminal being configured to have determined whether to at least partially accept the network defined condition for selecting the first access.

According to another exemplary aspect of the invention, a computer program is provided. The computer program, when being executed by a processor, is configured to carry out or control a method for requesting a connection setup of a connection between the terminal and a node of a radio access network as described above.

Further exemplary embodiments of the invention are described in the dependent claims.

BRIEF DESCRIPTION OF THE DRAWINGS

Embodiments of the invention will be described in more detail hereinafter with reference to examples, but to which the scope of the invention is not limited.

DETAILED DESCRIPTION

The illustration in the drawing is schematic. In different drawings, similar or identical elements and steps are provided with the same reference signs or with reference signs which are different from one another within the first digit.

In the following, the methods, the terminal, the node, and the computer program according to the exemplary aspects of the invention will be explained in more detail.

Within the context of this application, the term "network defined condition of the radio access network" may particularly denote a condition or prerequisite which may be defined by the radio access network, and which may relate to one or more constraints to be posed.

According to the exemplary aspects of the invention, a terminal may be provided with an option of selecting a particular access to a radio access network. To this end, one of the supported accesses, namely the first access, may be provided with a network defined condition set by the radio access network. A discrimination whether to select the first access or the second access may be based on a determination of the terminal regarding an at least partial acceptance of the network defined condition by the terminal.

Therefore, an efficient support of a diversity of terminals and services in a radio access network may be provided, since each terminal may be capable of selecting its own appropriate and required access type. Further, a utilization of network resources may be improved, since depending on the type of used access more terminals may simultaneously use the available network resources. Therefore a particularly automatic management of a quality of service experienced by the terminals in the radio access network may be improved.

In particular, from a perspective of the radio access network, a Radio Resource Management (RRM) admission control may be provided at a very early time of a connection setup between a terminal and the radio access network, in particular at a time of an access negotiation between the terminal and the radio access network during setting up the connection. Further, this measure may enable the radio access network to discard or continue the connection setup of the connection depending on the requested first access. Further, the radio access network, in particular an operator of the radio access network, may be enabled to influence a deployment of applications or services by a terminal in that the network defined condition may be defined in such a way that a potential data transmission in the radio access network resulting from the applications may be implemented by the terminal in an efficient way, for example by bundling data transmissions of the applications in time.

From a perspective of the terminal, software and/or hardware constraints of the terminal may be met in an efficient way in that an access of the terminal to the radio access network may be selected which may best fit to the constraints of the terminal. For example, a terminal running an application or having a hardware limitation as described in the section "Background" may be provided with the possibility to select an appropriate access for the connection.

Next, further exemplary embodiments of the method executed by the terminal will be explained. However, these embodiments also apply to the method executed by the node, the terminal, the node, and the computer program.

In particular, the radio access network may support more than two access types, i.e. at least a third access being associated with a different condition.

In particular, the step of selecting may comprise selecting the first access, if the determination whether to at least partially accept the network defined condition may be in the affirmative. On the contrary, the terminal may select the second access, if the step of determining whether to at least partially accept the network defined condition is not in the affirmative, i.e. if the terminal may not accept the network defined condition at all.

The first access may be configured as a terminal specific access and the second access may be configured as a terminal independent access. Here, the term "terminal specific access" may particularly denote a radio access of the terminal to the radio access network which may comprise at least one connection characteristic related to the connection being individually defined for the terminal or for a specific type or class of terminals. The term "terminal independent access" may particularly denote a radio access of a terminal to a radio access network which may be equally defined for all terminals and may optionally be free of any condition related to the connection.

The method may further comprise receiving conditional information indicating the network defined condition for the first access, wherein at least one of the step of determining and the step of selecting may be executed based on the received conditional information. Therefore, the terminal may be accurately informed about the actual network defined condition, and storage resources of the terminal regarding the storage of a diversity of network defined conditions may still be kept low.

The step of receiving the conditional information may comprise receiving the conditional information together with system information in one message which may be periodically sent in the radio access network. Therefore, the terminal may be provided with the conditional information in a very easy and efficient way in that the conditional information may be sent or implemented in already existing or conventional periodic signaling within the radio access network.

The step of receiving the conditional information may comprise receiving the conditional information from a subscriber server, particularly a Home Subscriber Server (HSS), in response to a request of the terminal for the conditional information. In particular, the node of the radio access network may first determine the network defined condition, and may provide the conditional information or related information to the subscriber server which, in turn, may optionally derive the conditional information from the received information. The conditional information may be included in subscription information for the transmission between the subscriber server and the terminal. Therefore storage resources of the node may be kept low, while conventional signaling between the terminal and the subscriber server may be used for the retrieval of the conditional information.

The conditional information may be associated with at least one random access preamble, i.e. one or more random access preambles, wherein the at least one random access preamble, i.e. the one or the more random access preambles, may be part of a set of contention-free random access preambles defined by system information in the radio access network. The term "contention-free random access preamble" may particularly denote a random access preamble associated with handling, particularly avoiding, a possibility of a collision or contention between access attempts of different terminals. Therefore, the handling of the conditional information by the radio access network, the terminal and the subscriber server may be easily implemented in already existing network deployments, since a conventional contention-free random access preamble may be exchanged by the at least one random access preamble associated with the first access. A signaling overhead owing to the method may be avoided. Further, the terminal may be enabled to select the first access at a very early stage of the connection setup. In the case of the first access being configured as a terminal specific access, a waste of network resources may be avoided which may otherwise occur by a selection of the first access at a later stage of the connection setup or even during the established connection. Further, the method may be compatible with terminals in accordance with a currently available version and earlier versions of an E-UTRAN specification, for example terminals according to Release 10, since these terminals may interpret the random access preamble associated with the first access as a random access preamble for a contention-free access. Therefore these terminals will not unintentionally select the first access associated with the network defined condition by selecting one random access preamble out of the set of contention-free random access preambles unless the radio access network may have instructed the terminal to do so. A terminal capable of properly interpreting the at least one random access preamble associated with the first access included in the set of contention-free random access preambles may only request the first access in a case of a deliberate and conscious determination whether to at least partly accept the network defined condition, but otherwise may select the second access.

In particular, the conditional information may comprise an indication indicating that the at least one random access preamble may be associated with the first access. This indication may also indicate the network defined condition associated with the first access and the at least one random access preamble. Alternatively, the conditional information may optionally comprise an additional individual indication indicating the network defined condition associated with the at least one random access preamble. The terminal may be accordingly capable of properly interpreting the conditional information by either deriving from the indication the at least one random access preamble and the network defined condition or by deriving from the indication the at least one random access preamble and from the additional indication the network defined condition. Alternatively, the conditional information may comprise an indication indicating the network defined condition associated with the at least one random access preamble which may be preconfigured in the radio access network to be associated with the first access. The terminal may derive the network defined condition from the conditional information and may associate the derived network defined condition automatically with the preconfigured at least one random access preamble.

The at least one random access preamble may be part of a set of random access preambles each of which being associated with a network defined condition of the radio access network for the first access, wherein the set of random access preambles may be a subset of the set of contention-free random access preambles. In particular, each random access preamble may be associated with a different one network defined condition. Thus, the radio access network may define various network defined conditions each of which being configured as one or more random access preambles such that the first access may be correlated with a different network defined condition.

The method may further comprise selecting at least one requesting information from a group of requesting information comprising a random access preamble associated with the first access, wherein the random access preamble may be part of a set of contention-free random access preambles defined by system information in the radio access network, and an indicator of a message indicator field, wherein the step of requesting may comprise sending the selected at least one requesting information. The group of the requesting information may be preconfigured in the terminal, and/or may be dynamically extended by the terminal particularly in response to receiving the conditional information. Therefore the terminal may be adapted to select the appropriate requesting information to be easily interpreted by the node, thereby facilitating the method.

In particular, the selected at least one random access preamble may correspond to the at least one random access preamble associated with the conditional information and being defined in the system information, therefore facilitating a recognition of the type of request by the node. The terminal may only be allowed to select the random access preamble as the requesting information for requesting the first access, if the random access preamble may be defined by or configured by the system information.

In particular, the indicator of the message indicator field may comprise or may be configured as, particularly one or more bits or code points of, a conventional message indicator field of a conventional message, a new indicator of a new message indicator field of a conventional message or a new indicator of a new message indicator field of a new message. Therefore, further information, for example regarding an extent of an acceptance of the terminal for the network defined condition and/or terminal requirements of the terminal for the connection may be transmitted in the request. Accordingly, the node may be enabled to differentiate the requested service of the terminal in more detail. In particular, in a case of an absence of the random access preamble based requesting information the indicator may serve as indication for the request, while in a case of transmitting both the random access preamble and the indicator as requesting information, the indicator may serve as an additional information element for the node, but may not form the basis for the determination of the node whether to grant the request or not. However, it may also be possible that the random access preamble together with the indicator may be used as necessary input information for the determination whether to grant the request of the terminal for the first access.

In particular, the step of requesting may comprise sending the selected requesting information, for example one requesting information or more requesting information, in one message or more messages.

The step of requesting may comprise sending, in a random access preamble message, particularly in a Random Access Preamble message, a random access preamble associated with the first access, wherein the random access preamble may be part of a set of contention-free random access preambles defined by system information in the radio access network. Therefore, as detailed above, conventional signaling at a very early stage of the connection setup may be employed for transferring the requesting information to the node of the radio access network. Further, efforts for implementing the method in current communication networks may be low, since a conventional format type and/or message type may be used for sending the requesting information.

The step of requesting may comprise sending an indicator of a message indicator field in a connection setup request message, particularly in a RRCConnectionRequest message. For example, the indicator of the message indicator field may be configured in E-UTRAN as one or more code points of an Establishment Cause of the RRCConnectionRequest message or may be configured as an indicator of a new indicator message field of the RRCConnectionRequest message. Therefore, as detailed above, the request for the first access may be transmitted to the node of the radio access network together with further information for a subsequent evaluation.

The step of requesting may comprise sending, in a random access procedure, the random access preamble prior to the indicator. Thus, two kind of requesting information may be sent in separate request messages from the terminal to the node for the request of the first access. In particular, the node of the radio access network may determine to grant the request for the first access, if the random access preamble, the indicator or both the radio access preamble and the indicator may be received or included in the respective request messages.

The network defined condition may comprise a connection characteristic related to the connection using the first access, wherein the connection characteristic may be limited compared to a connection characteristic of a connection between the terminal and the radio access network using the second access of the terminal to the radio access network. Here and above, the term "connection characteristic related to the connection" may particularly denote one or more connection related features, for example a frequency range or a connection state of the terminal. The feature may be defined or set by the radio access network for the dedicated connection or, when timely or causally seen, in association with the connection. Therefore, the selected first access for the connection may enable a connection between the terminal and the node of the radio access network with limited connection characteristic such that network resources of the radio access network for the connection may be low. In addition, the radio access network may be enabled to serve more terminals simultaneously.

Here, a limited connection characteristic may be a connection characteristic comprising an upper limit and/or a lower limit.

The connection characteristic may comprise at least one of a connection time of the connection, a total amount of resources of an uplink and/or downlink data transmission associated with the connection, a frequency range or bandwidth of an uplink and/or downlink data transmission associated with the connection, a usage of a service and/or a capability of the terminal during the connection, a usage of a service and/or a capability of the radio access network during the connection, a usage of the first access by the terminal subsequent to an ending of the connection, and a connection state of the terminal subsequent to an ending of the connection. The term "connection time of the connection" may particularly denote a time interval defined by a start time and an end time. The start time may be associated with the initiation of the setting up of the connection, and the end time may be associated with the time when the connection may be torn down or discarded. The term "connection state of the terminal" may particularly denote a communication state of the terminal, for example an idle state or a connected state when being connected to a radio access network. In particular, by limiting a total amount of resources or a frequency range of the data transmission a maximum achievable transmission and reception throughput may be restricted. In particular, the terminal may not be allowed to set up a connection to the radio access network for a dedicated time duration subsequent to an ending of the connection with or without usage of the first access. In particular, the dedicated time duration may be indicated in the conditional information configured as the random access preamble of the system information. Altogether, these types of limited connection characteristics may allow the node to simultaneously serve more and/or different types of terminals.

In particular, the connection characteristic may comprise a coverage area for the terminal being connected using the first access, wherein the coverage area may be, when spatially seen, smaller than a total coverage area of the radio access network. Thus, the terminal may only be allowed to use the first access in a limited area, whereby a spatial resources management of network resources by the radio access network may be accomplished.

Further, the network defined condition may comprise a connection characteristic related to the connection using the first access, wherein the connection characteristic may comprise a lower limit. For example, the connection characteristic may be a minimum value of a carrier frequency used during the data transmission of the connection.

Next, further exemplary embodiments of the method executed by the node will be explained. However, these embodiments also apply to the method executed by the terminal, the terminal, the node, and the computer program.

The method may further comprise determining whether to grant the received request for the first access, and sending, to the terminal, granting information indicating a grant of the first access based on a result of the step of determining. In particular, the granting information may be sent, if the step of determining may be in the affirmative. Otherwise, the node may omit to send the granting information to the terminal. The determination may be based on the received requesting information and/or a signaling load in the radio access network. In particular, a presence of the requesting information in the request may cause a positive determination result of the node, wherein an absence of the requesting information may result in a negative determination result of the node. Accordingly, the terminal may be informed about the result and may instantaneously adapt a usage of its capabilities or usage of applications to the network defined condition.

The method may further comprise evaluating the received request for determining an extent of an acceptance of the network defined condition by the terminal and/or terminal requirements of the terminal related to the connection, wherein at least one of the step of determining whether to grant the received request and the step of sending the granting information may be executed based on a result of the step of evaluating. Therefore, the node may deduce further information regarding the requested first access, and may accordingly adapt the connection characteristic associated with the first access and being defined by the network defined condition. Further, an accuracy of the determination of the node may be enhanced by basing the determination on additional input information.

In particular, the node of the radio access network may compare the determined extent of the acceptance of the network defined condition by the terminal to a threshold for determining whether to grant the received request. Additionally or alternatively, the node may investigate the indicated terminal requirements to be in accordance with actually available network resources.

The method may further comprise at least one of determining the network defined condition of the radio access network for the first access, and sending, to the terminal, conditional information indicating the determined network defined condition. Additionally or alternatively, the node may send the network defined condition to the subscriber server to make the conditional information available for the terminal upon request. Here, the node may comprise a mapping function to associate the network defined condition with the conditional information, particularly with the at least one random access preamble. Therefore, the node may be configured to flexibly define the network defined condition, and may adapt the network defined condition according to an actual deployment of network resource utilization. Here, the network defined condition may change between two condition determination steps, and the terminal may select the first access associated with the network defined condition determined by only one determination step of the node.

Next, further exemplary embodiments of the terminal will be explained. However, these embodiments also apply to the methods, the node, and the computer program.

The terminal may be further configured to, particularly automatically, execute one or more steps of the method described above.

Next, further exemplary embodiments of the node will be explained. However, these embodiments also apply to the methods, the terminal, and the computer program.

The node may be configured as a Radio Network Controller (RNC) or a NodeB of an Universal Mobile Telecommunications System Terrestrial Radio Access Network (UTRAN), a Base Station Controller (BSC) or a Base Station (BS) of an Global System of Mobile Communications (GSM) Edge Radio Access Network (GERAN) or an eNodeB of an Evolved Universal Mobile Telecommunications System Terrestrial Radio Access Network (E-UTRAN). E-UTRAN is commonly referred to as Long Term Evolution (LTE).

The node may be further configured to, particularly automatically, execute one or more steps of the method described above.

Figure 1:
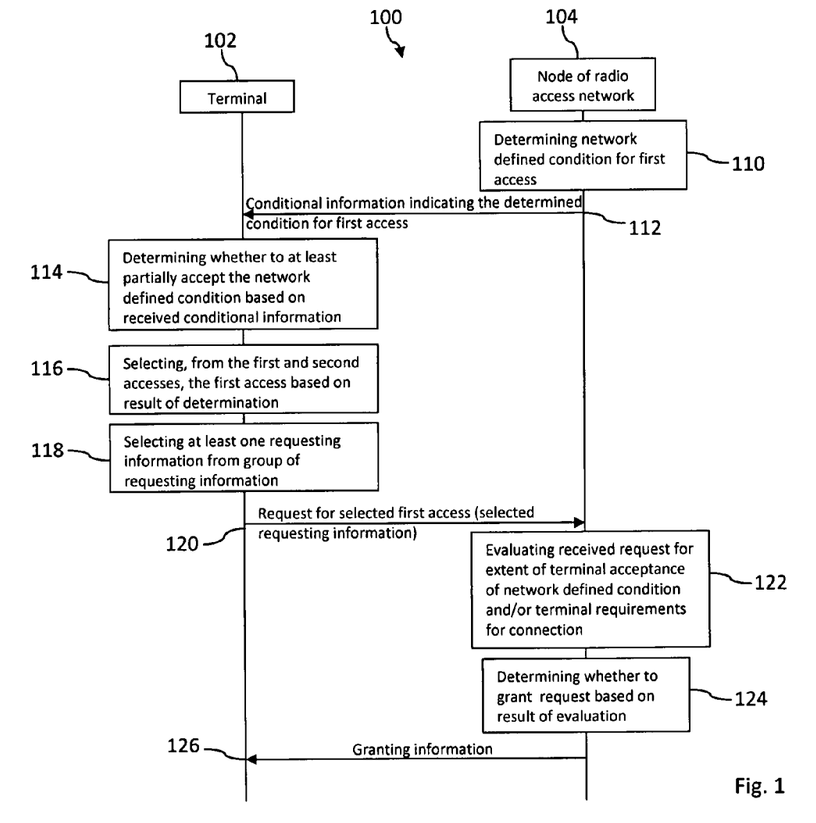
FIG. 1 is a flow diagram illustrating a method for requesting a connection setup of a connection between a terminal and a node of a radio access network according to a first exemplary embodiment of the invention.

Referring to FIG. 1, a method for requesting a connection setup of a connection between a terminal and a node of a radio access network according to a first exemplary embodiment of the invention will be explained. A communication system associated with the method comprises a radio access network 100, for example an E-UTRAN based radio access network, in which a terminal 102 is located. The radio access network 100 further comprises a node 104, for example an eNodeB of the E-UTRAN radio access network 100. The radio access network 100 supports a first access and a second access of the terminal 102 to the radio access network 100 for the connection. The first access is configured as a terminal specific access, and the second access is configured as a terminal independent access, i.e. a regular access offering connection characteristics regardless of a type or class of the terminal or the individual terminal using the second access. Alternatively, the radio access network 100 may be configured as UTRAN, and the node may be a NodeB or a RNC. Further, the radio access network 100 may be configured as GERAN, and the node may be a BSC or a BS.

The terminal 102 requires a limited connection characteristic for the connection to be established, for example a limited bandwidth for an uplink and downlink data transmission between the terminal 102 and the radio access network 100, since the terminal 102 is configured as a mobile phone running one or more applications such as VoIP, Facebook etc.

In a first step 110 of the method, the node 104 determines a network defined condition for the first access. Here, the network defined condition relates to a limited bandwidth for the uplink and downlink data transmission between a terminal and the radio access network 100. Next, the node 104 associates the network defined condition with a dedicated random access preamble in the case of E-UTRAN for forming conditional information to be sent to the terminal 102. The dedicated random access preamble is part of a set of random access preambles, wherein each of the random access preambles of this set is associated with a, potentially different, network defined condition. For example, each random access preamble of this set is associated with a different one network defined condition or at least two random access preambles of this set are associated with a same network defined condition. This set represents a subset of a set of contention-free access preambles. The set of contention-free access preambles is, together with two further sets each of which comprising contention-based random access preambles in accordance with Third Generation Partnership Project (3GPP) Technical Specification (TS) 36.321, configured by system information regularly broadcasted in the radio access network 100. The random access preambles of the set of random access preambles for contention-free random access except the dedicated random access preamble are also defined in accordance with 3GPP TS 36.321. In the case of the radio access network 100 being UTRAN or GERAN, the conditional information is configured in a dedicated System Information Block.

Next, in a step 112, the node 104 sends the conditional information indicating the determined network defined condition for the first access to the terminal 102. Upon reception of the conditional information, the terminal determines in a step 114 whether to at least partially accept the network defined condition based on the received conditional information. Here, the terminal derives, based on an indication of the conditional information indicating the dedicated random access preamble being associated with the first access, both the dedicated random access preamble and the respective network defined condition. For example, the terminal 102 determines to fully accept the network defined condition, since the limited bandwidth defined by the network defined condition is much larger than the actual required bandwidth for VoIP. Hence, the determination in the step 114 is in the affirmative. If the determination in the step 114 was not in the affirmative, the method would stop. In a next step 116, the terminal 102 accordingly selects, from the first access and the second access, the first access.

In a next step 118, the terminal 102 selects at least one requesting information to be sent to the node 104 from a group of requesting information comprising, firstly, a random access preamble in the case of E-UTRAN or a System Information Block in the case of UTRAN or GERAN and, secondly, an indicator of a message indicator field. This step 118 is based on the conditional information received in the step 112 and stored requesting information comprising further random access preambles of the subset of the system information in the case of E-UTRAN or System Information Blocks in the case of UTRAN or GERAN and an indicator of a message indicator field. The terminal 102 selects the dedicated random access preamble or the dedicated System Information Block, respectively, defined in the system information received in the step 112, and includes this information in a requesting message sent to the node 104 in a subsequent step 120. Next, in a step 122, the node 104 evaluates the received request for an extent of a terminal acceptance of the terminal 102 of the network related condition in addition to terminal requirements of the terminal 102 for the connection to be set-up. This step 122 is executed for deriving further information about a connection characteristic of the connection to be set-up. To this end, the node 104 retrieves information stored in the node 104 regarding the network defined condition, i.e. the dedicated random access preamble or the System Information Block defined by system information and the indication sent in the step 112, and a further pre-configuration for indicators of various message indicator fields. Both evaluations result in null information, since the received random access preamble or System Information Block solemnly indicates the network defined condition.

In a next step 124, the node 104 determines whether to grant the request based on the received request in the step 120 and an amount of signaling load in the radio access network 100. Since the received requesting information, namely the random access preamble or the System Information Block, indicates the terminal request for the first access and the signaling load in the radio access network 100 is low, the node 104 determines to grant the request of the terminal 102 for the first access. If the determination was not in the affirmative, the method would stop at the step 124. Next, in a step 126, the node 104 sends respective granting information indicating the grant of the first access to the terminal 102.

Further, the step 124 may be based on the received request in the step 120 in addition to a positive result of the evaluation in the step 122, i.e. to a result different from null information and/or a result being in accordance with pre-defined threshold values for the extent of the terminal acceptance and/or the terminal requirements. Since the result of the step 122 corresponds to null information, the step 124 of determining whether to grant the request would, in such a case, be not in the affirmative, and the method would stop at the step 124.

Figure 2:
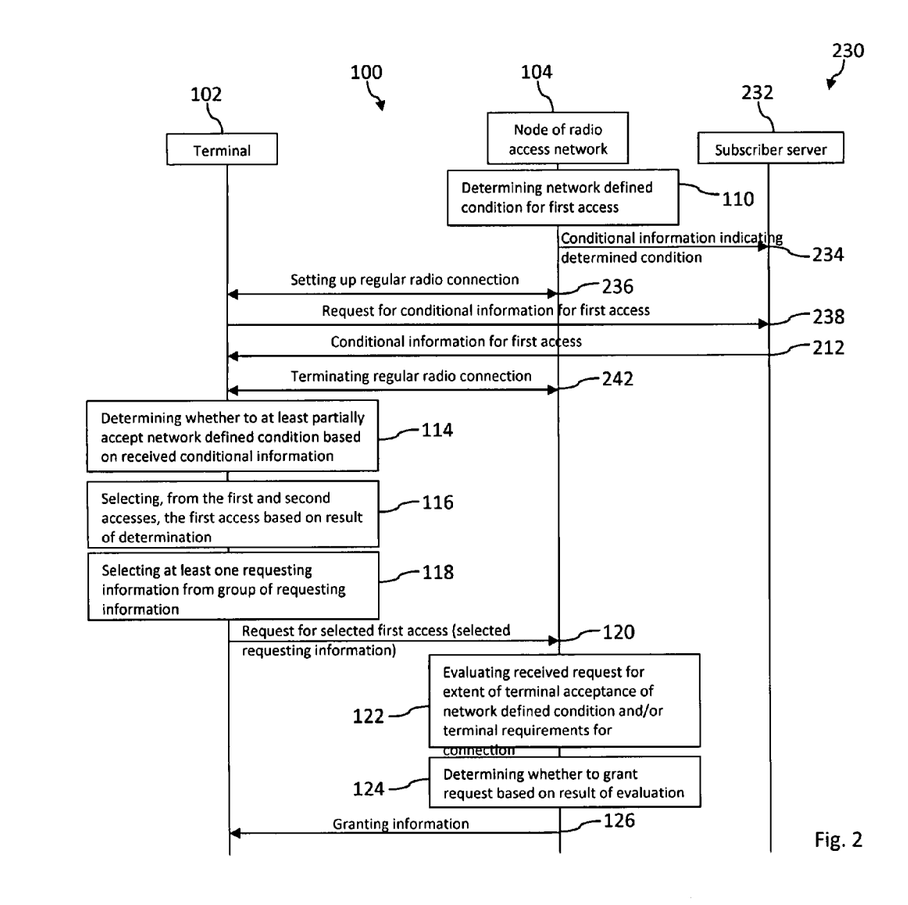
FIG. 2 is a flow diagram illustrating a method for requesting a connection setup of a connection between a terminal and a node of a radio access network according to a second exemplary embodiment of the invention.

Referring to FIG. 2, a method for requesting a connection setup of a connection between a terminal and a node of a radio access network according to a second exemplary embodiment of the invention will be explained. The radio access network 100 in FIG. 2 is identical to the radio access network 100 shown in FIG. 1. Further, the radio access network 100 is part of an Internet Protocol System (IMS) based communication network 230 comprising a subscriber server 232, for example a HSS.

The method according to the second exemplary embodiment is similar to the method according to the first exemplary embodiment. However, a node 104 of the radio access network 100 does not sent the conditional information to the terminal 102 in the step 112, but send the conditional information in a step 234 to the subscriber server 232 for further storage. In a subsequent step 236, the terminal 102 sets up a regular radio connection to the node 104 using the second access, and requests in a step 238 the conditional information for the first access from the subscriber server 232. The subscriber server 232 sends in a step 212 subscription information comprising the conditional information for the first access to the terminal 102. In a step 242, the terminal terminates the connection to the node 104. Thereupon, the method proceeds with the step 114 of FIG. 1. Further, in the step 118, the node 104 selects an indicator of a message field of a connection set-up message, but not the dedicated random access preamble or the dedicated System Information Block, and accordingly sends the selected indicator in the step 120 to the node 104. Further, the node 104 successfully evaluates in a step 122 further information regarding the bandwidth actually required by the terminal 102, and adapts the bandwidth associated with the first access accordingly either subsequent to the step 122 or to a step 124. The determination step 124 is also in the affirmative, since the node 104 evaluates the indicator to be present in the received request.

Figure 3:
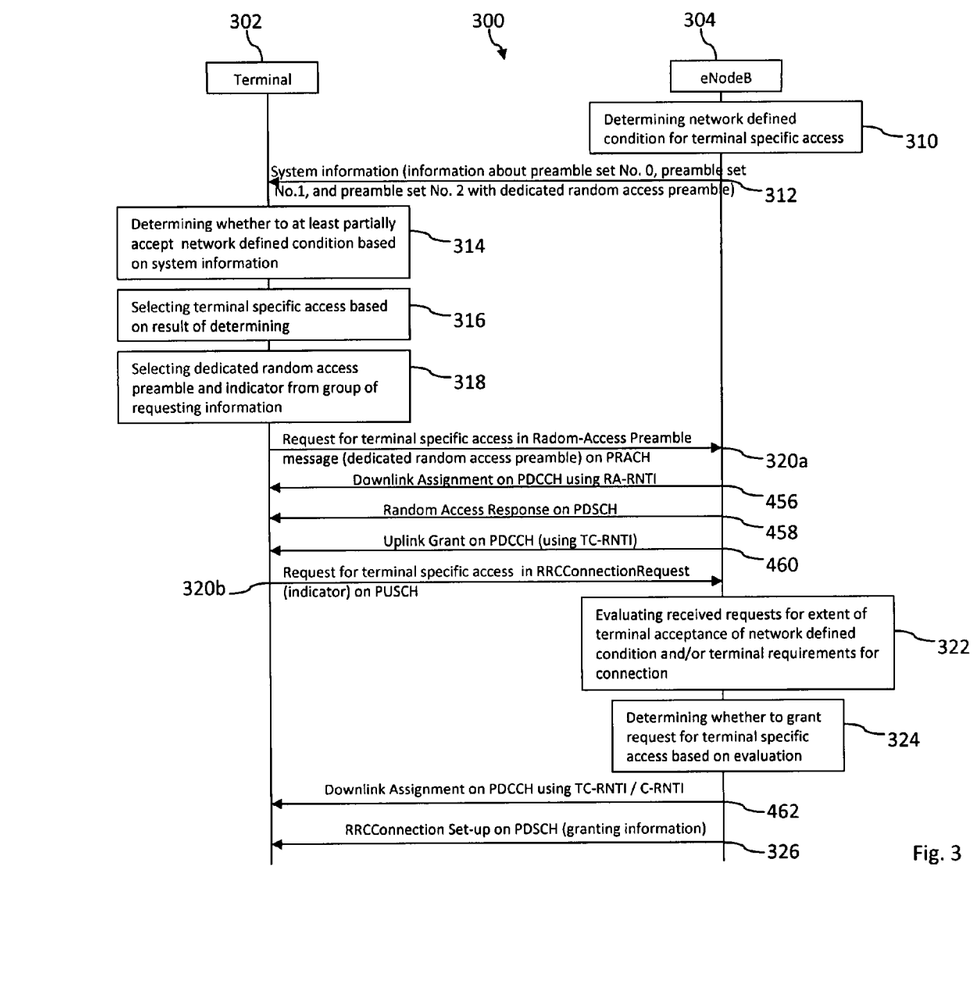
FIG. 3 is a flow diagram illustrating a method for requesting a connection setup of a connection between a terminal and a node of a radio access network according to a third exemplary embodiment of the invention.

Referring to FIG. 3, a method for requesting a connection setup of a connection between a terminal and a node of a radio access network according to a third exemplary embodiment of the invention will be explained. In this embodiment, the radio access network 300 is configured as an E-UTRAN radio access network in which a terminal 302 is located. A node 304 of the radio access network 300 is configured as an eNodeB. The radio access network 300 supports a first access of the terminal 302 to the eNodeB 304 which is configured as a terminal specific access for a connection, and a second access of the terminal 302 to the eNodeB 304 which is configured as a terminal independent or regular access for the connection. The connection setup procedure used by the terminal 302 is a random access procedure according to 3GPP Release 10.

The terminal 302 is a machine communication type device (MTC device) which shows an infrequent and low data transmission in addition to limited energy resources. Therefore, the terminal 302 requires a limited connection characteristic for a connection to be set-up, namely a limited connection duration and a limited downlink and uplink radio bandwidth associated with the data transmission during the connection.

In a first step 310 of the method, the eNodeB 304 determines a network defined condition for the terminal specific access which corresponds to a limited connection duration and a limited downlink and uplink bandwidth associated with the data transmission during the connection.

After converting the network defined condition into conditional information associated with a dedicated random access preamble defined in system information in the radio access network 300, the eNodeB 304 broadcasts in a next step 312 the system broadcast information received by the terminal 302. The conditional information comprises one indication indicating both that the dedicated random access preamble is associated with the first access and the network defined condition. The dedicated random access preamble associated with the conditional information as well as the content of the system information will be explained with reference to FIGS. 4 and 5.

Figure 4:
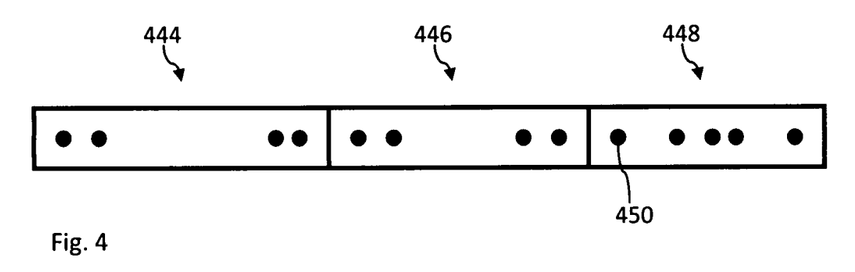
FIG. 4 is a block diagram illustrating sets of random access preambles in an E-UTRAN radio access network.

FIG. 4 illustrates a conventional Physical Random Access Channel (PRACH) configuration as configured using system information broadcasted in each cell of the E-UTRAN radio access network 300. The system information comprises 64 random access preambles divided in three sets 444-448 of random access preambles. The random access preambles in the first set 444 are associated with a contention-based access, and the set 444 is labeled in FIG. 3 as "preamble set No. 0". The random access preambles in the second set 446 also correspond to a contention-based access, and the set 446 is labeled in FIG. 3 as "preamble set No. 1". The random access preambles in the third set 448 are associated with a contention-free access, and the set 448 is labeled in FIG. 3 as "preamble set No. 2". For ease of explanation, one random access preamble of the third set 448 is denoted by the reference numeral 450.

Figure 5:
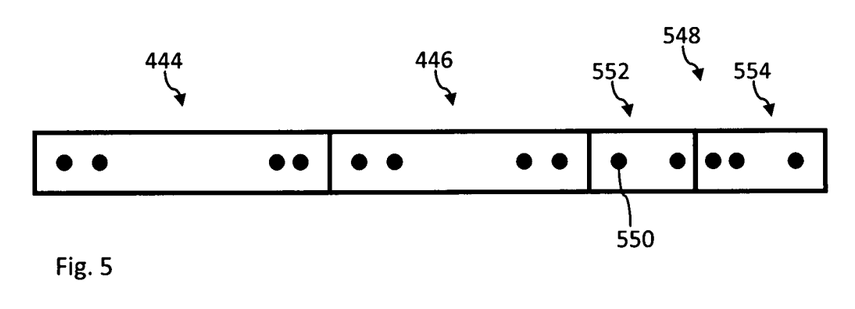
FIG. 5 is a block diagram illustrating sets of random access preambles in an E-UTRAN radio access network associated with the method in FIG. 3.

In FIG. 5, a PRACH configuration which comprises the random access preambles as configured by the system information to be used in association with the method of FIG. 3 will be explained. The sets 444, 446 of random access preambles for the contention-based access are identical to the sets 444, 446 illustrated in FIG. 4. The set 548 associated with the contention-free access is divided into a subset 552 comprising random access preambles associated with the first access and a subset 554 associated with the contention-free radio access. I.e. the random access preambles in the subset 552 are associated with the terminal specific access and the random access preambles in the subset 554 are associated with the contention-free access. The random access preamble 550 is part of the subset 552. For example, the dedicated random access preamble indicated in the system information sent in the step 312 may be the random access preamble 550 of FIG. 5.

Again referring to FIG. 3, upon reception of the system information, the terminal 302 adds the dedicated random access preamble 550 indicated in the system information to a group of requesting information stored in the terminal 302. The terminal 302 then determines in a step 314 whether to at least partially accept the network defined condition based on the received conditional information included in the system information. In the following, it is assumed that the terminal 302 accepts the network defined condition regarding the connection during, but not regarding the uplink and downlink bandwidths. Therefore, the determination is in the affirmative, and the terminal 302 selects in a step 316 the terminal specific access to be used for the connection setup. Alternatively, if the determination is not in the affirmative, the method will stop. Next, in a step 318, the terminal 302 further selects, from the group of requesting information, the dedicated random access preamble 550 and an indicator of an Establishment Cause indicator field of a RRCConnectionRequest message as requesting information to be sent to the eNodeB 304 in two separate request messages.

In a step 320a, the terminal 302 sends a request for the terminal specific access in a Random Access Preamble message comprising the selected random access preamble 550 on the Physical Random Access Channel (PRACH). In a step 456, the eNodeB 304 sends a Downlink Assignment on a Physical Downlink Control Channel (PDCCH) using a Random Access-Radio Network Temporary Identifier (RA-RNTI) for identifying the time and frequency resource of a communication in the step 320a between the terminal 302 and the eNodeB 304. In a step 458, the eNodeB 304 sends a Random Access Response message on the Physical Downlink-Shared Channel (DL-SCH) comprising the index of the random access preamble sequences having been previously detected by the eNodeB 304 of the E-UTRAN radio access network 300 and for which the response message is valid, the timing correction calculated by the random access preamble receiver, and a scheduling grant. Next, in a step 460, the eNodeB 302 sends an uplink grant on the PDCCH using a Temporary Cell-Radio Network Temporary Identifier (TC-RNTI).

Next, in a step 320b, the terminal 302 sends a further request for the terminal specific access in the RRCConnectionRequest message including the selected indicator on a Physical Uplink-Shared Channel (PUSCH). This message is transmitted in consequence of the Random Access Response message and uses resources assigned to the terminal in the Random Access Response message. The purpose of this message of the random access procedure is to assign a unique identity to the terminal 302 within the cell of the random access network 300, namely the C-RNTI. Further, the terminal 302 transmits all necessary information to the eNodeB 302 using the uplink-shared channel resources assigned to the terminal 302 in the random access response of the step 460. This message also allows the terminal 302 to adjust the grant size and modulation scheme as well as allows for HARQ with soft combining for the uplink message.

Next, in a step 322, the eNodeB 302 extracts further information from the requesting information of the messages received in the steps 320a, b by evaluating the requesting information for an extent of a terminal acceptance of the terminal 302 for the network defined condition and the terminal requirements for the connection to be set up. The eNodeB 304 determines from the random access preamble 550 null information regarding the extent of the terminal acceptance for the network defined condition and the terminal requirements for the connection, since the dedicated random access preamble 550 is associated with the network defined condition, i.e. the connection characteristics set by the eNodeB 304 in the step 310. However, based on the indicator received in the step 320b, the eNodeB 304 determines that the terminal 302 has accepted the network defined condition regarding the connection duration, but not regarding the uplink and downlink bandwidths. Further, the eNodeB 304 determines, based on the indicator, that a requirement of the terminal 302 for the connection is a much shorter connection duration as defined by the network defined condition.

Next, in a step 324, the eNodeB 304 determines whether to grant the received requests for the terminal specific access based on the requesting information of both request messages of the steps 320a, b in combination with a result of the evaluation in the step 322. A determination rule is as follows: The determination is in the affirmative, if at least one requesting information is received by the eNodeB 304 and at least one evaluation in the step 322 results in information distinct from null information. Since two requesting information has been received, the terminal 302 has half agreed to the network defined condition and the terminal requirement regarding a shorter connection duration can be extracted, the eNodeB 304 determines to grant the request of the terminal 302 for the terminal specific access. If this determination was not in the affirmative, the method would stop. Further, the eNodeB 304 adjusts the connection duration of the connection for the terminal specific access to correspond to the terminal requirements evaluated in the step 322.

Next, in a step 462, the eNodeB 304 sends a downlink assignment on the PDCCH using the assigned TC-RNTI and C-RNTI. Thereupon, in a step 326, the eNodeB 304 sends a RRCConnectionSetup message to the terminal 302 on the PDSCH comprising granting information indicating the grant of the eNodeB 304 for the terminal specific access. This message also serves for contention resolution in the radio access network 300. In particular, each terminal 302 receiving this downlink message will compare the identity in the message with the identity transmitted in the step 320a. Only a terminal observing a match between the identity received in the step 326 and the identity transmitted as part of the message in the step 320a will declare the random access procedure to be successful. Alternatively, the terminal 302 has to restart the random access procedure again.

It is noted that a terminal according to previous Releases and the current Release 10 may interpret the radio access preamble 550 received in the step 312 as a random access preamble for a contention-free access, and may thus proceed with the method in the steps 314, 316, if the terminal uses the dedicated random access preamble 550 for a contention-free access only when being instructed by the radio access network 300 during a handover procedure.

Figure 6:
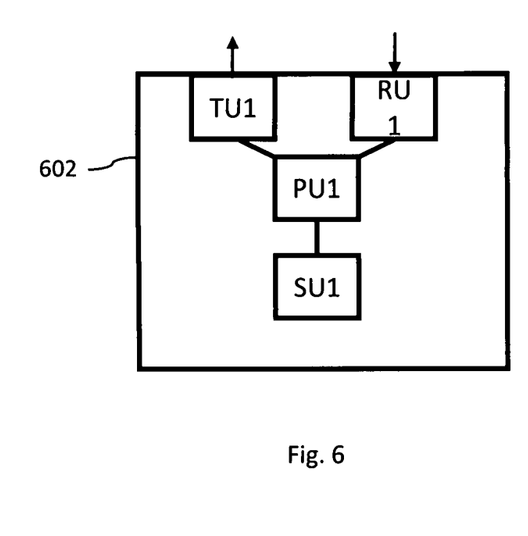
FIG. 6 is a block diagram illustrating a terminal for requesting a connection setup of a connection between the terminal and a node of a radio access network according to an exemplary embodiment of the invention.

Referring to FIG. 6, a terminal 602 for requesting a connection setup of a connection between the terminal 602 and a node of a radio access network is illustrated. The radio access network supports a first access and a second access of the terminal 602 to the radio access network for the connection. The terminal 602 comprises a determination unit configured to determine whether to at least partially accept a network defined condition of the radio access network associated with the first access, a selection unit configured to select, from the first access and the second access, the first access based on a result of the determination unit, and a requesting unit configured to request, from the node, the selected first access for the connection.

The determination unit and the selection unit are part of a processing unit PU1 of the terminal 602. The processing unit PU1 is configured to process information related to a method for requesting a connection setup of a connection between a terminal and a node of a radio access network as described above. The terminal 602 further comprises a reception unit RU1 configured to receive information related the method, a sending unit TU1 configured to send information related to the method, and a storage unit SU1 configured to store information related to the method. The requesting unit is part of the sending unit TU1, the processing unit PU1, and the storage unit SU1. Alternatively, the requesting unit may be only part of the sending unit TU1.

In particular, the determination unit is configured to interpret conditional information to derive the network defined condition to be provided with the selection unit. Further, the selection unit of the processing unit PU1 is configured to select at least one requesting information from a group of requesting information.

The terminal 602 is configured to execute one or more steps of the above mentioned method, and comprises respective functionally defined units configured to execute the one or more steps of the method.

Figure 7:
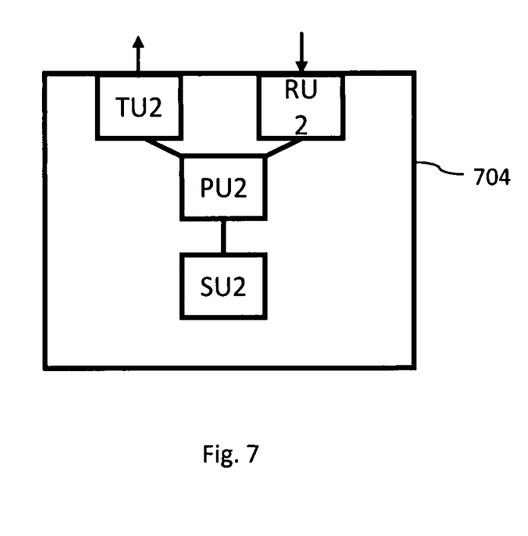
FIG. 7 is a block diagram illustrating a node of a radio access network for being requested for a connection setup of a connection between a terminal and the node of the radio access network according to an exemplary embodiment of the invention.

Referring to FIG. 7, a node 704 of a radio access network for being requested for a connection setup of a connection between a terminal and the node 704 of the radio access network is illustrated. The radio access network supports a first access and a second access of the terminal to the radio access network for the connection. The node 704 comprises a reception unit RU2 configured to receive a request for the selected first access for the connection, wherein the first access is associated with a network defined condition of the radio access network for the connection, from the terminal being configured to have determined whether to at least partially accept the network defined condition for selecting the first access.

The node 704 further comprises a sending unit TU2 configured to send information related to a method for requesting a connection setup of a connection between a terminal and a node of a radio access network as described above, a processing unit PU2 configured to process information related to the method, and a storage unit SU2 configured to store information related to the method.

A determination unit of the processing unit PU2 is configured to determine whether to grant the received request from the terminal and to determine the network defined condition prior to the sending of conditional information either to the terminal or a subscriber server. An evaluation unit of the processing unit PU1 is configured to evaluate the received request for determining an extent of an acceptance of the network defined condition by the terminal and/or terminal requirements for the connection.

The node 704 is configured to execute one or more steps of the above mentioned method, and comprises respective functionally defined units configured to execute the one or more steps of the method.

The node 704 is configured as an eNodeB of an E-UTRAN radio access network.

The above functionally defined units of the terminal 602 and the node 704 can differ from the actual, physical units of the terminal 602 and the node 704, respectively. For example, the determination unit of the terminal 602 may be part of the processing unit PU1 and the storage unit SU1, and the processing unit PU2 and the storage unit SU2 of the node 704 may work together to determine the network defined condition. Further, one of more functions of the above described functional units of the terminal 602 and the node 704 may be implemented in one or more functional units. For example, the node 704 may comprise two separate determination units, namely one determination unit configured to determine whether to grant the received request and one determination unit configured to determine the network defined condition.

While the invention has been illustrated and described in detail in the drawings and foregoing description, such illustration and description are to be considered illustrative or exemplary and not restrictive; the invention is not limited to the disclosed embodiments, and in particular not to those embodiments in accordance with the cited 3GPP TSs. Other variations to the disclosed embodiments can be understood and effected by those skilled in the art in practicing the claimed invention, from a study of the drawings, the disclosure, and the appended claims. In the claims, the word "comprising" does not exclude other elements or steps, and the use of indefinite articles "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A method for requesting a connection setup of a connection between a terminal and a node of a radio access network, wherein the radio access network supports a first access and a second access of the terminal to the radio access network for the connection, wherein the method is executed by the terminal, the method comprising:
   determining whether to at least partially accept a network defined condition of the radio access network associated with the first access,
   selecting, from the first access and the second access, the first access based on a result of the step of determining, and
   requesting, from the node, the selected first access for the connection.

2. The method according to claim 1, wherein the first access is configured as a terminal specific access and the second access is configured as a terminal independent access.

3. The method according to claim 2, wherein the conditional information is associated with at least one random access preamble, wherein the at least one random access preamble is part of a set of contention-free random access preambles defined by system information in the radio access network.

4. The method according to claim 3, wherein the at least one random access preamble is part of a set of random access preambles each of which being associated with a network defined condition of the radio access network for the first access, wherein the set of random access preambles is a subset of the set of contention-free random access preambles.

5. The method according to claim 1, the method further comprising:
   receiving conditional information indicating the network defined condition for the first access,
   wherein at least one of the step of determining and the step of selecting are executed based on the received conditional information.

6. The method according to claim 5, wherein the step of receiving the conditional information comprises receiving the conditional information together with system information in one message which is periodically sent in the radio access network.

7. The method according to claim 5, wherein the step of receiving the conditional information comprises receiving the conditional information from a subscriber server in response to a request of the terminal for the conditional information.

8. The method according to claim 1, the method further comprising:
   selecting at least one requesting information from a group of requesting information comprising a random access preamble associated with the first access, wherein the random access preamble is part of a set of contention-free random access preambles defined by system information in the radio access network, and an indicator of a message indicator field,
   wherein the step of requesting comprises sending the selected at least one requesting information.

9. The method according to claim 1, wherein the step of requesting comprises sending, in a random access preamble message, particularly in a Random Access Preamble message, a random access preamble associated with the first access, wherein the random access preamble is part of a set of contention-free random access preambles defined by system information in the radio access network.

10. The method according to claim 9, wherein the step of requesting comprises sending, in a random access procedure, the random access preamble prior to the indicator.

11. The method according to claim 1, wherein the step of requesting comprises sending an indicator of a message indicator field in a connection setup request message, particularly in a RRCConnectionRequest message.

12. The method according to claim 1, wherein the network defined condition comprises a connection characteristic related to the connection using the first access, wherein the connection characteristic is limited compared to a connection characteristic of a connection between the terminal and the radio access network using the second access of the terminal to the radio access network.

13. The method according to claim 12, wherein the connection characteristic comprises at least one of:
   a connection time of the connection,
   a total amount of resources of a data transmission associated with the connection,
   a frequency range of a data transmission associated with the connection,
   a usage of a service and/or a capability of the terminal during the connection,
   a usage of a service and/or a capability of the radio access network during the connection,
   a usage of the first access by the terminal subsequent to an ending of the connection, and
   a connection state of the terminal subsequent to an ending of the connection.

14. A computer program, which, when being executed by a processor, is configured to carry out or control a method for requesting a connection setup of a connection between the terminal and a node of a radio access network according to claim 1.

15. A method for requesting a connection setup for a connection between a terminal and a node of a radio access network, wherein the radio access network supports a first access and a second access of the terminal to the radio access network for the connection, wherein the method is executed by the node, the method comprising:
   receiving a request for the selected first access for the connection, wherein the first access for the connection is associated with a network defined condition of the radio access network, for the connection, from the terminal having determined whether to at least partially accept the network defined condition for selecting the first access.

16. The method according to claim 15, the method further comprising:
   determining whether to grant the received request for the first access, and
   sending, to the terminal, granting information indicating a grant of the first access based on a result of the step of determining.

17. The method according to claim 15, the method further comprising:
   evaluating the received request for determining an extent of an acceptance of the network defined condition by the terminal and/or terminal requirements of the terminal related to the connection,
   wherein at least one of the step of determining whether to grant the received request and the step of sending the granting information are executed based on a result of the step of evaluating.

18. The method according to claim 15, the method further comprising at least one of:

determining the network defined condition of the radio access network for the first access, and sending, to the terminal, conditional information indicating the determined network defined condition.

19. The node according to claim 18, wherein the node is further configured to execute a method comprising:

receiving a request for the selected first access for the connection, wherein the first access for the connection is associated with a network defined condition of the radio access network, from the terminal having determined whether to at least partially accept the network defined condition for selecting the first access;

determining whether to grant the received request for the first access, and sending, to the terminal, granting information indicating a grant of the first access based on a result of the step of determining.

20. A terminal for requesting a connection setup of a connection between the terminal and a node of a radio access network, wherein the radio access network supports a first access and a second access of the terminal to the radio access network for the connection, the terminal comprising:

one or more receivers;
one or more transmitters; and
one or more processors for:
determining whether to at least partially accept a network defined condition of the radio access network associated with the first access, selecting from the first access and the second access, the first access based on a result of the determination unit, and employing one of said transmitters to request, from the node, the selected first access for the connection.

21. The terminal according to claim 20, wherein the terminal is further configured to execute a method comprising:

determining whether to at least partially accept a network defined condition of the radio access network associated with the first access, selecting, from the first access and the second access, the first access based on a result of the step of determining, and requesting, from the node, the selected first access for the connection.

22. A node of a radio access network for being requested for a connection setup of a connection between a terminal and the node of the radio access network, wherein the radio access network supports a first access and a second access of the terminal to the radio access network for the connection, the node comprising:

a reception unit (RU2) configured to receive a request for the selected first access for the connection, wherein the first access is associated with a network defined condition of the radio access network for the connection, from the terminal being configured to have determined whether to at least partially accept the network defined condition for selecting the first access.

23. The node according to claim 22, wherein the node is configured as a Radio Network Controller or a NodeB of an Universal Mobile Telecommunications System Terrestrial Radio Access Network, a Base Station Controller or a Base Station of an Global System of Mobile Communications Edge Radio Access Network or an eNodeB of an Evolved Universal Mobile Telecommunications System Terrestrial Radio Access Network.

* * * * *